United States Patent
Sohier et al.

(10) Patent No.: US 11,978,708 B2
(45) Date of Patent: May 7, 2024

(54) CHIP OR SYSTEM-IN-PACKAGE PROTECTION USING THE GMI EFFECT

(71) Applicant: COMMISSARIAT A L'ENERGIE ATOMIQUE ET AUX ENERGIES ALTERNATIVES, Paris (FR)

(72) Inventors: Thibaut Sohier, Grenoble (FR);
Stephan Borel, Grenoble (FR);
Jean-Philippe Michel, Grenoble (FR);
Gilles Simon, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 185 days.

(21) Appl. No.: 17/304,258

(22) Filed: Jun. 17, 2021

(65) Prior Publication Data

US 2021/0398918 A1 Dec. 23, 2021

(30) Foreign Application Priority Data

Jun. 19, 2020 (FR) ...................................... 20 06442

(51) Int. Cl.
*H01L 23/00* (2006.01)
*G06F 21/87* (2013.01)

(52) U.S. Cl.
CPC ............ *H01L 23/576* (2013.01); *G06F 21/87* (2013.01)

(58) Field of Classification Search
CPC ........... H01L 23/576; H01L 2223/6677; H01L 2924/1433; H01L 2924/1434;
(Continued)

(56) References Cited

U.S. PATENT DOCUMENTS

2001/0033012 A1* 10/2001 Kommerling ........ G06K 19/073
257/679
2005/0116307 A1 6/2005 De Jongh et al.
(Continued)

FOREIGN PATENT DOCUMENTS

CN 111933196 B * 6/2022 ............. G11C 11/15
DE 10 2013 205 729 A1 10/2014
(Continued)

OTHER PUBLICATIONS

French Preliminary Search Report dated Mar. 3, 2021 in French Application 20 06442 filed on Jun. 19, 2020, 2 pages (with English Translation of Categories of Cited Documents).

*Primary Examiner* — Nduka E Ojeh
*Assistant Examiner* — Laura M Dykes
(74) *Attorney, Agent, or Firm* — Oblon, McClelland, Maier & Neustadt, L.L.P.

(57) ABSTRACT

Device of the chip or electronic system-in-package type, comprising at least one element for protecting at least part of at least one face of the device, said protective element comprising at least:
an attack detection element of the device comprising at least one GMI-effect electrically conductive material, and
a magnetic field emitter to which said GMI-effect electrically conductive material is to be subjected,
and wherein the GMI effect is to be achieved in said GMI-effect electrically conductive material when an exciting alternating electric current flows therethrough and when subjected to the magnetic field of the magnetic field emitter.

14 Claims, 3 Drawing Sheets

(58) Field of Classification Search
CPC ... H01L 2924/1461; H01L 2924/19105; H01L 2924/3025; G06F 21/87; G01R 33/063
USPC ........................................................ 257/531
See application file for complete search history.

(56) References Cited

U.S. PATENT DOCUMENTS

| | | |
|---|---|---|
| 2006/0097332 A1 | 5/2006 | De Jongh et al. |
| 2008/0042834 A1* | 2/2008 | Daughton ........... G11C 11/1695 340/551 |
| 2008/0164868 A1 | 7/2008 | Servel |
| 2011/0068441 A1* | 3/2011 | Pannetier .............. H01L 23/552 257/659 |
| 2013/0141089 A1* | 6/2013 | Dyer ................. G01R 33/0052 324/252 |
| 2013/0249029 A1* | 9/2013 | Vig ........................ G01D 5/147 257/427 |
| 2014/0266185 A1* | 9/2014 | Sidman .............. G01R 33/0005 324/252 |
| 2016/0092680 A1 | 3/2016 | Hennig et al. |

FOREIGN PATENT DOCUMENTS

| | | | | |
|---|---|---|---|---|
| FR | 2 881 823 A1 | | 8/2006 | |
| GB | 2553289 A | * | 3/2018 | ............. G08B 13/00 |
| WO | WO 03/085410 A1 | | 10/2003 | |
| WO | WO-2014005431 A1 | * | 1/2014 | ............. G01D 3/028 |

\* cited by examiner

CHIP OR SYSTEM-IN-PACKAGE PROTECTION USING THE GMI EFFECT

TECHNICAL FIELD

The invention relates to the field of protection of electronic chips and system-in-packages, or SiP.

STATE OF PRIOR ART

Attacks that a chip or SiP may undergo are generally aimed at accessing confidential data stored in the memory of an electronic circuit of the chip or SiP. A chip or SiP can be attacked either in software or hardware way. In the second case, attacks, known as physical attacks, can be carried out in various ways: chemical, laser, electromagnetic, electrical, etc.

Some attacks, known as non-invasive attacks or by auxiliary channels, do not involve an introduction into the device (chip or SiP) under attack. These attacks consist in measuring data external to the device: measurement of the power consumption of the device, measurement of electromagnetic emissions emanating from the device, measurement of heat emitted by the device, etc.

Other attacks, known as semi-invasive attacks, involve a moderate introduction into the device under attack which remains operational or functional after these attacks, such as attacks by fault injection using a laser (light pulse). These attacks are carried out both from the front face of the device and from its rear face (which corresponds to the face on the side of which the connection elements are located, for example the connection balls).

Finally, other attacks, known as invasive attacks, involve partially destroying the package of the device under attack, such as probing attacks and retrofitting. These attacks involve accessing and irreversibly modifying the circuit, which may or may not remain functional after these attacks.

Laser or photoelectric attacks are currently the most common physical attacks perpetrated due to the widespread availability of tools for implementing these types of attacks. Most often, such an attack consists in exciting a region of the circuit comprising at least one transistor so as to make it change state. The laser used emits, for example, in the case of rear face attacks, in the near infrared or near UV. This unexpected change of state of the transistor induces errors, or faults, in the execution of one or more operations implemented in the circuit under attack. If these correspond to encryption/decryption operations, it is possible, by analyzing erroneous values, to retrieve information relating to the encryption key (that is the value of bits that make it up) used by the circuit under attack.

To counter laser attacks carried out from the front face of devices, it has especially been provided to add diode-based light detectors to the front face. It has also been provided to add an "anti-intrusion" layer to the front panel, formed for example by a coil on which a continuous measurement of the electrical resistance is carried out in order to verify that a region of the front face has not been damaged in order to provide access to the circuit for the laser beam.

Similar protection solutions have also been provided for the rear face of devices.

Electromagnetic wave attacks generally consist in either carrying out fault injection into the circuit components of the chip or SiP under attack via electromagnetic pulses, or deducing the value of the bits making up an encryption key from observations of the electromagnetic field emitted by the chip or system in operation. There are solutions to counter this type of attack, such as for example making an electromagnetic shielding on one or more faces of the device or emitting parasitic electromagnetic waves in order to smooth the electromagnetic spectrum emanating from the chip or the SiP.

In general, solutions provided so far to protect chips and SiPs from these attacks are not completely satisfactory because they remain vulnerable. Furthermore, none of these solutions offer a solid protection against electromagnetic wave attacks, which can be carried out with injectors providing waves of highly varied frequencies and which can be located at different places. Finally, some protections can only be applied to chips and not to SiPs.

Furthermore, attacks aiming at investigating or disrupting the operation of a device are usually carried out while the device is supplied. It is then possible to detect these attacks by measuring in real time a physical quantity characteristic of a protective structure, such as an electrical resistance or a light intensity for example. But in some cases, the attacks can take place while the component is not supplied. Detection is then only possible a posteriori when the component is supplied again and in operation, which makes detection more difficult and therefore protection less effective.

DISCLOSURE OF THE INVENTION

There is therefore a need to provide a new type of protection for an electronic chip or an electronic system-in-package which is effective against all types of attacks, whether or not they require access to the chip or the system-in-package or damage to the chip or the system-in-package (by laser, electromagnetic waves, probing attack, retrofitting, etc.).

For this, a device of the electronic chip or system-in-package (or SiP) type is provided, comprising at least one element for protecting at least part of at least one face of the device, said protective element being disposed in the device and comprising at least:

an attack detection element of the device comprising at least one electrically conductive material with a giant magneto-impedance, GMI, effect, and a magnetic field emitter to which the GMI-effect electrically conductive material is to be subjected, and wherein the GMI effect is to be achieved in the GMI-effect electrically conductive material when an exciting alternating electric current flows therethrough and when subjected to the magnetic field of the magnetic field emitter.

Thus, it is provided to actively protect the device by virtue of the use of an electrically conductive material with a giant magneto-impedance (GMI) effect. By virtue of this effect, the attack detection element of the device has characteristics, especially its impedance, which change in the event of an attack on the region of the device protected by the protective element or in the event of the removal or modification of at least part of the attack detection element of the device. Some attacks can especially modify the impedance of the attack detection element irreversibly, making it impossible to restore this impedance value after the attack.

The protective element may be disposed in front of the region of the device to be protected so that an attack cannot be implemented without removing or modifying this protective element to gain access to this region of the device.

One advantage brought about by the GMI effect is that a significant variation in the impedance of the attack detection element of the device is achieved even when the variation in the magnetic field to which that element is subjected is small. Another advantage relating to the use of a ferromagnetic material is that its magnetization has a different value depending on the sense of variation (increasing or decreasing) of the magnetic field to which it is subjected, thereby providing information on its history and thus detecting a posteriori that an EM attack has previously taken place.

This device makes it possible to block some attacks, to detect some attacks in real time, and to detect some attacks a posteriori.

In this device, reading the characteristics (impedance) of the attack detection element of the device, when the device is electrically supplied, makes it possible to verify that no modification has been made to the protective element (and therefore that the protected region of the device has undergone attack), even when the device was not electrically supplied. For this, the impedance of the detection element is measured and compared with a reference value, for example stored in a memory of the device, for a given magnetic field value.

The protective element of the device thus makes it possible to detect any modification of the electromagnetic environment of the device, conferring good protection of the device especially against electromagnetic attacks, as well as any modification of the structure of the protective element, conferring good protection of the device against laser attacks or other attacks requiring access to the component.

Furthermore, the materials used to form the protective element act as a shield, or screen, against electromagnetic waves, which helps to protect the device.

The GMI effect obtained corresponds to a strong variation in the impedance of the electrically conductive material exhibiting such an effect, when a high frequency alternating exciting current (in the order of a few kHz to several GHz, for example between 1 kHz and 10 GHz) flows therethrough and when subjected to an external magnetic field which depends on the material used and which is, for example, in the order of 1 Oe or 80 A/m, or between approximately 1 Oe and 100 Oe, or a magnetic field between approximately 0.1 mT and 10 mT.

The amplitude of the alternating exciting current is, for example, between 5 mA and 300 mA, or between 10 mA and 300 mA, or between 20 mA and 300 mA.

An electronic system-in-package, or SiP, corresponds to a set of electronic chips, integrated circuits or other components (passive, MEMS, etc.) enclosed in a single package or module, these chips being disposed next to each other and/or on top of each other, on a support, and electrically connected to each other and to connections external to the package by wires and/or by flip-chip.

The GMI-effect electrically conductive magnetic material may correspond to a material with the following properties:
 which is soft magnetic, that is easily magnetisable by virtue of a narrow hysteresis cycle;
 the coercive field of which Hc is less than or equal to 10 Oe;
 the relative magnetic permeability of which is greater than or equal to 100.

Advantageously, the GMI-effect electrically conductive material may be a soft ferromagnetic material.

The device may comprise a memory, a Field Programmable Gate Array (FPGA) or an Application-Specific Integrated Circuit (ASIC) comprising, for example, a processor as well as other components such as passive components, sensors, etc.

The device may comprise an encapsulation material covering at least the attack detection element of the device, or covering the protective element.

The attack detection element of the device may comprise at least:
 a portion of the GMI-effect electrically conductive material, or
 a portion of non-magnetic, or amagnetic, and electrically conductive material disposed between at least two portions of the GMI-effect electrically conductive material, or
 a portion of non-magnetic, or amagnetic, and electrically conductive material surrounded by the GMI-effect electrically conductive material which forms a sheath around the portion of non-magnetic and electrically conductive material, or
 an alternating stack of portions of non-magnetic, or amagnetic, and electrically conductive material and portions of GMI-effect electrically conductive material (alternating magnetic and non-magnetic materials: magnetic/non-magnetic/magnetic/non-magnetic/magnetic/ . . . /magnetic).

By making the attack detection element with at least one portion of non-magnetic, or amagnetic, and electrically conductive material disposed between at least two portions of the GMI-effect electrically conductive material, the GMI properties obtained in this attack detection element are improved in comparison with an attack detection element comprising only a portion of the GMI-effect electrically conductive material. By making the attack detection element with a portion of non-magnetic, or amagnetic, and electrically conductive material surrounded by the GMI-effect electrically conductive material which forms a sheath around the portion of non-magnetic and electrically conductive material, the improvement in GMI properties is even greater.

The non-magnetic, or amagnetic, material may correspond to a paramagnetic or diamagnetic, or non-ferromagnetic material.

A paramagnetic material corresponds to a material which, when subjected to a magnetic field, can acquire a weak magnetization in the same direction as the magnetic field, and which loses this magnetization as soon as it is no longer subjected to this magnetic field. Such a paramagnetic material corresponds for example to aluminum or platinum.

A diamagnetic material corresponds to a material which, when subjected to a magnetic field, can acquire a weak magnetization in the opposite direction to the magnetic field, and which loses this magnetization as soon as it is no longer subjected to this magnetic field. Such a diamagnetic material is, for example, copper, zinc, silver or gold.

The GMI-effect electrically conductive material may correspond to a metal, or a metal alloy, comprising at least one of the following elements: Fe, Ni, Co.

The non-magnetic material may correspond to at least one of the following materials: titanium, gold, copper, tungsten, aluminum, platinum, silver, zinc.

The GMI-effect electrically conductive material has one or more magnetic anisotropies. Such a magnetic anisotropy may be achieved by subjecting the GMI-effect electrically conductive material to a magnetic field when deposited, during the production of the protective element, and/or by implementing annealing under a magnetic field after depositing the electrically conductive material or even at the end of the production of the device. Such anisotropy furthermore makes it possible to enhance protection conferred by the protective element because it adds a difficult to reproduce characteristic to the protective element. Advantageously, this magnetic anisotropy may have a randomly generated variability, which makes it possible to enhance non-reproducibility of the protective element. This particularization of the protection makes it different from one device to another and prevents an attacker from using his knowledge of one device to attack another one.

The protective element may form a sensor located in front of said part of the face of the device protected by the protective element, or the protective element may form a protective layer disposed in front of the entire surface of the face of the device protected by the protective element.

The attack detection element of the device may extend, in a plane parallel to said face of the device protected by the protective element, in at least a coil and/or spiral pattern. This configuration of the detection element provides additional protection especially against laser attacks.

The magnetic field emitter may comprise particles of magnetic material dispersed in a material at least partially surrounding the attack detection element of the device, and/or the magnetic field emitter may comprise at least one portion of electrically conductive material in which a direct or alternating electric current is to flow.

The integrity control of the protective element is performed by measuring the complex impedance of the detection element when an alternating current (AC) flows therethrough and when subjected to the magnetic field created by the field emitter. This magnetic field may be static (for example if the field emitter comprises magnetic particles or if it comprises a conductive material with DC current flowing therethrough) or variable (if the field emitter has AC current flowing therethrough).

The integrity control of the protective element may also be completed by a measurement at the field emitter. If a DC current flows through the field emitter, this is a resistance measurement; if an AC current flows therethrough, a complex impedance measurement would be performed. The advantage of a complex impedance measurement over a resistance measurement is that a modification involving a phase shift in the current flowing through the field emitter can also be detected, which provides additional information and improves protection. If, in addition, the field emitter also exhibits a GMI effect, then this complex AC current impedance measurement will be highly dependent on the magnetic environment and the field emitter will then form a second detection element that will interact with the first detection element In one particular embodiment:
several parts of the attack detection element of the device may each be formed by at least two distinct portions, spaced apart from each other and each comprising two ends connected to both ends of the other portion, and
several parts of the portion of electrically conductive material of the magnetic field emitter may each be formed by at least two distinct portions spaced apart from each other, each comprising two ends connected to both ends of the other portion, and
the attack detection element of the device and the portion of electrically conductive material of the magnetic field emitter may be disposed next to each other such that the portions of the parts of the attack detection element of the device being on the side of the portion of electrically conductive material of the magnetic field emitter are disposed in an interlocking manner with the portions of the parts of the portion of electrically conductive material of the magnetic field emitter on the side of the attack detection element of the device.

In this configuration, each of the portions (except possibly those at the ends of the detection element) of the parts of the attack detection element of the device on the side of the portion of electrically conductive material of the magnetic field emitter may be disposed between two portions of the parts of the portion of electrically conductive material of the magnetic field emitter being on the side of the attack detection element of the device. In addition, each of the portions (except possibly those at the ends of the detection element) of the parts of the portion of electrically conductive material of the magnetic field emitter on the side of the attack detection element of the device may be disposed between two portions of the parts of the attack detection element of the device being on the side of the portion of the electrically conductive material of the magnetic field emitter.

In this configuration, the detection element and the conductive portion of the magnetic field emitter form a sequence of current dividers that interact with each other. The detection of an attack in one part of the protective element will rapidly propagate throughout the detection element, yielding a large variation in its impedance.

The portion of electrically conductive material of the magnetic field emitter may extend, in a plane parallel to said face of the device protected by the protective element, in at least a coil and/or spiral pattern. This configuration of the portion of electrically conductive material of the magnetic field emitter provides additional protection especially against laser attacks if the dimension or disposition of the patterns does not allow passage therethrough.

The protective element may comprise at least two distinct attack detection elements of the device extending next to each other and next to which the portion of electrically conductive material of the magnetic field emitter is disposed.

The attack detection element of the device and the portion of electrically conductive material of the magnetic field emitter may be disposed in two different planes and such that the distance between them, along a direction perpendicular to the face of the device protected by the protective element, is not constant. Such a configuration makes it possible to enhance protection conferred by the protective element because it adds a difficult to reproduce characteristic (the variable distance between the attack detection element of the device and the portion of electrically conductive material of the magnetic field emitter) to the protective element. This configuration may be obtained by arranging the detection element and the portion of electrically conductive material of the magnetic field emitter on top of each other and separated by a layer of non-constant thickness.

The attack detection element of the device may comprise one or more parts the dimensions of which are such that said parts are degraded upon attack of the device. These parts of the detection element may form "fuses", that is parts that degrade or even destroy themselves when the current flowing through the detection element is increased by an attack. This configuration provides additional protection to the device from potential attacks on the device.

The device may further comprise:
a device for reading the impedance of the attack detection element of the device;
a memory in which at least one reference value of the impedance of the attack detection element of the device is to be stored.

An alternating current source may be electrically coupled to the attack detection element of the device. This current source may be external to the device.

The device may further comprise a memory in which a plurality of binary values are stored, each of said binary values being representative of a comparison between a reference value and an impedance value of the attack detection element of the device for a given value of the magnetic field to be emitted by the magnetic field emitter.

These different binary values, when considered together, form a binary code representing a "signature" of the attack detection element of the device. A modification in this binary code, when reading the impedances of the detection element and comparing the read values with reference values, means that the device has undergone attack.

BRIEF DESCRIPTION OF THE DRAWINGS

The present invention will be better understood upon reading the description of exemplary embodiments given purely by way of indicating and in no way limiting purposes with reference to the appended drawings in which.

Identical, similar or equivalent parts of the different figures described below bear the same reference numerals so as to facilitate switching from one figure to another.

The various parts shown in the figures are not necessarily shown on a uniform scale, in order to make the figures easier to read.

The various possibilities (alternatives and embodiments) should be understood as not being exclusive of each other and can be combined with each other.

DETAILED DISCLOSURE OF PARTICULAR EMBODIMENTS

Figure 1:
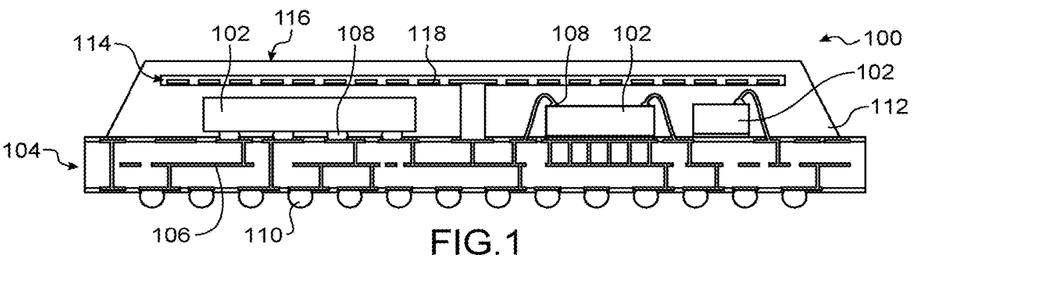
FIG. 1 schematically shows a device provided with a protective element, according to one particular embodiment.

FIG. 1 schematically shows a device 100 provided with a protective element according to one particular embodiment.

The device here 100 corresponds to an electronic system-in-package, or SiP. The device 100 comprises electronic components 102 and a support 104 to which the components 102 are coupled. The support 104 forms the rear face of the device 100. The support 104 corresponds, for example, to an organic or ceramic or metal substrate.

The device 100 also comprises a metal redistribution layer (or RDL) 106 disposed on and in the support 104 and to which electrical connections 108, corresponding for example to microbeads, of the components 102 are mechanically and electrically coupled (flip chip coupling on the left and wire bonding on the right in the exemplary embodiment visible in FIG. 1). Some portions of the metal redistribution layer 106 are electrically connected, through the support 104, to connection pins 110 of the device 100 which correspond for example to connection balls. One or more other portions of the metal redistribution layer 106 may electrically connect electrical connections 108 to each other. The metal redistribution layer 106 comprises, for example, one of the following materials: Cu, Au, Al.

The device 100 also comprises an encapsulation material 112 surrounding the components 102. This encapsulation material 112 is especially for mechanically protecting the components 102. The encapsulation material 112 comprises, for example, an epoxy resin filled with silica beads.

The device 100 comprises a protective element 114 of at least part of at least one face 116 of the device 100 which is on the side opposite to that where the connection pins 110 are situated. In the exemplary embodiment shown in FIG. 1, the protective element 114 protects the entire surface of the components 102 being on the side of the face 116 and is disposed above the components 102, in the encapsulation material 112.

The protective element 114 comprises:
 an attack detection element 118 of the device 110 comprising at least one GMI-effect electrically conductive material, and
 a magnetic field emitter to which said GMI-effect electrically conductive material is subjected.

In the exemplary embodiment described herein, the element 118 comprises electrically connected portions of electrically conductive material having a GMI effect forming a protective layer located on the side of the front or rear face of the components 102 (depending on how the components 102 are bonded), thereby protecting the components 102 from attacks conducted through the face 116 of the device 100.

According to one exemplary embodiment, the electrically conductive material having a GMI effect of the element 118 corresponds to a metal or a metal alloy comprising at least one of the following metals: Fe, Ni, Co, and for example NiFe and/or CoTaZr. The material of the element 118 may also correspond to a conductive polymer or conductive carbon.

Figure 2:
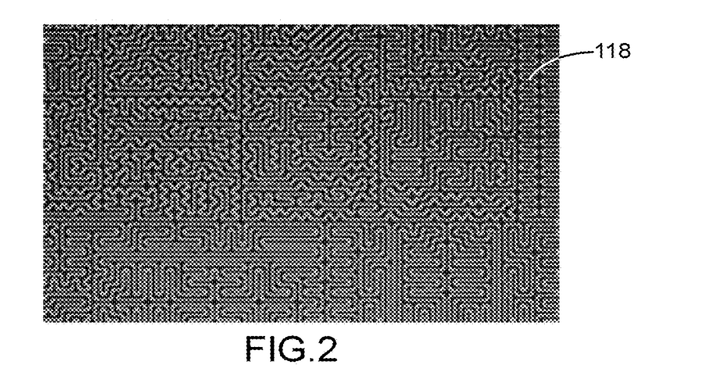
FIG. 2 shows one exemplary embodiment of the attack detection element of the device according to one particular embodiment.

According to one exemplary embodiment, the element 118 extends on the side of the face 116 of the device 100, in a plane parallel to the face 116, in a pattern of one or more coils, namely comprises numerous portions connected to each other forming bends and baffles so as to form a complex and difficult to identify pattern. FIG. 2 shows element 118 made with such a coil pattern. Other patterns than one or more coils are possible, such as spiral patterns.

According to one exemplary embodiment, the magnetic field emitter to which the GMI-effect electrically conductive material of the element 118 is subjected is at least partly formed by particles of magnetic material (not visible in FIG. 1) dispersed in the encapsulation material 112. These magnetic particles correspond, for example, to particles of magnetite, steel, ferrite, AlNiCo, samarium-cobalt or neodymium-iron-boron, and the diameter of which is, for example, between a few hundred nm and a few micrometers. One or more different magnetic materials may be used to form these particles. The magnetic particles may be provided, upon producing the device 100, directly incorporated into the encapsulation material 112 or in the form of a magnetic ink incorporating these particles and deposited onto the material 112.

The magnetic field, here generated by the magnetic particles dispersed in the encapsulation material 112, enables the element 118 to operate with the GMI effect. Reading the characteristics of the element 118, especially its impedance, when an alternating current flows in this element 118 (for example of a few tens of mA and having a frequency of about 1 GHz) makes it possible to verify that no modification has been made to the element 118 and to its magnetic environment (for example the magnetic field emitter when the latter is dissociated from the element 118), including when the device 100 was not electrically supplied. For example, the measured impedance of the element 118 is compared to a given reference value for the value of the magnetic field to which the element 118 is theoretically subjected. If the measured impedance is different from the reference value, then protective measures may be taken, such as deleting sensitive data stored in the device 100 or turning the device 100 OFF. The reference value is stored in a memory of the device 100, for example a non-volatile memory (for example Flash, EEPROM type) which can be programmed only once (OTP type).

In the event of an electromagnetic wave attack, the value of the magnetic field to which the element 118 is subjected is modified under the effect of these waves. This modification in the magnetic field yields a modification in the value of the impedance of the element 118. The measured impedance of the element 118 will then be different from the expected value (which is for example stored as a reference value in the device 100) and the attack will be detected. Furthermore, magnetic materials are good shielding materials and absorb electromagnetic waves better than other metal materials. This would also be the case if a laser attack was carried out against the device 100 as it would be necessary to remove the element 118 to carry out the attack, and the attack will be detected. An attack requiring physical impairment of the encapsulation material 112 (for example a probing or retrofitting or LASER attack, involving, for example, making a hole in the encapsulation material 112) will also modify the value of the magnetic field to which the element 118 is subjected when the encapsulation material includes magnetic particles. An attack involving physical impairment of the element 118 will also modify the value of its impedance. The measured impedance of the element 118 will then differ from the expected value and the attack will also be detected. Devices used for attacks other than EM fault injections may also generate a magnetic field that modifies the value of the magnetic field to which the element 118 is subjected.

Thus, any modification in the environment around the element 118 or the structure of the element 118 is detected by virtue of the protective element 114 of the device 100.

Typically, the protective element 114 may be made by depositing the material(s) of the element 118 and then implementing etching in the desired pattern for the detection element 118. The encapsulation material 112 is then deposited.

The GMI-effect electrically conductive material of the element 118 exhibits at least one magnetic anisotropy, that is exhibits at least one favored magnetic orientation in the direction of the magnetic field imposed during the deposition of the element material 118 or after such deposition by, for example, carrying out magnetic field annealing. Such magnetic anisotropy is achieved, for example, by imposing a magnetic field to which the soft ferromagnetic material is subjected during deposition. This gives the element 118 an arbitrary characteristic allowing the element 118 to be particularized, making it very difficult to reproduce the element 118, for example if an attacker contemplates replacing part of the element 118 identically when attacking the device 100 (for example to make a wire diversion).

It is possible that this magnetic anisotropy may have a randomly generated variability, thereby enhancing non-reproducibility of the protective element.

Figure 3:
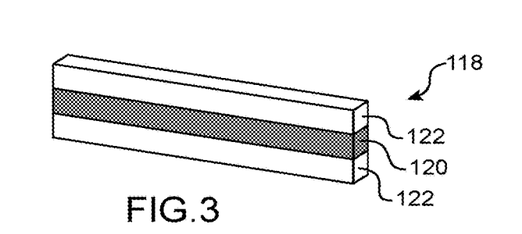
FIGS. 3 and 4 schematically show part of an attack detection element of the device according to different alternative embodiments.

In the exemplary embodiment previously described, the element 118 is formed by a portion of GMI-effect electrically conductive material extending, in a plane parallel to the face 116 of the device 100, in a pattern of one or more coils. Alternatively, the element 118 may comprise a portion 120 of non-magnetic (or paramagnetic or diamagnetic) and electrically conductive material disposed between at least two portions 122 of GMI-effect electrically conductive material. The portion 120 comprises, for example, titanium or gold, or a metal or metal alloy having no magnetic properties. This alternative is schematically shown in FIG. 3 which shows a portion of such an element 118. According to another alternative, it is possible that the element 118 comprises an alternating stack of portions 120 of non-magnetic electrically conductive material and portions 122 of GMI-effect electrically conductive material.

Figure 4:
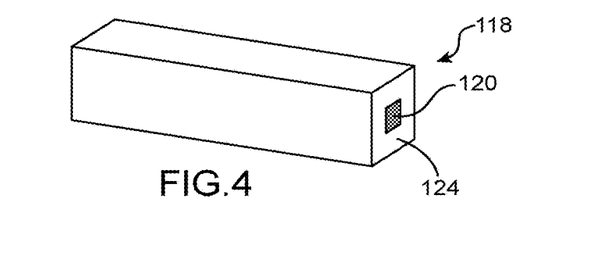

According to another alternative embodiment, the portion 120 may be surrounded by the GMI-effect electrically conductive material which thereby forms a sheath 124 around the portion 120. This other alternative is schematically shown in FIG. 4 which shows a portion of such an element 118.

In the previously described exemplary embodiment, the protective element 114 forms a protective layer protecting the entire face 116 of the device 100. Alternatively, the protective element 114 may provide protection to only one part of the face 116 of the device 100. For this, the element 118 is made facing one part only of the face to be protected, so that the protective element 114 forms a sensor located in front of the region of the face of the device 100 to be protected. Several sensors may cooperate to protect an entire face or several faces of the device 100.

Figure 5:
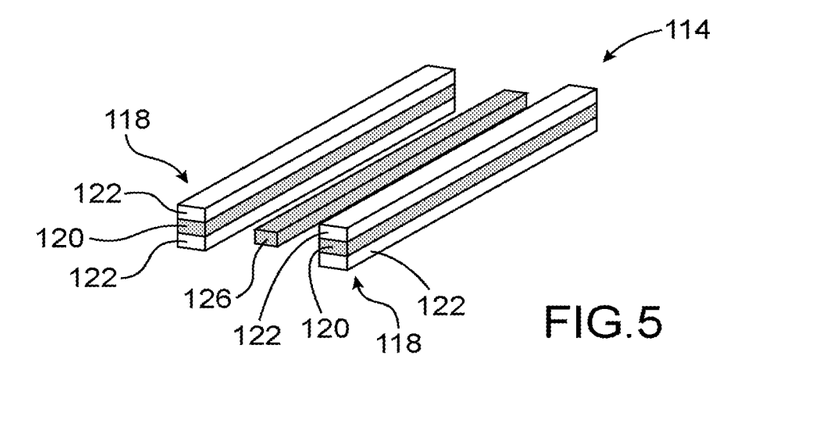
FIGS. 5 to 10 schematically show parts of a protective element of the device according to alternative embodiments.

FIG. 5 shows another alternative embodiment of a protective element 114 of the device 100.

Here, the protective element 114 comprises two detection elements 118 next to which a portion 126 of electrically conductive material is disposed. A direct or alternating electric current is to flow through the portion 126 which forms the magnetic field emitter to which the elements 118 are subjected.

The encapsulation material 112 may not comprise magnetic particles. In this case, the magnetic field emitter of the protective element 114 is only formed by the portion 126. Alternatively, it is possible that the encapsulation material 112 comprises magnetic particles which, in this case, together with the portion 126, form the magnetic field emitter of the protective element 114 of the device 100.

The elements 118 and the portion 126 extend on the side of the face of the device 100 to be protected, for example in a pattern of coil(s) and/or spiral(s), such as the element 118 according to the previously described exemplary embodiments. When the protected face of the device 100 corresponds to the face 116, the elements 118 and the portion 126 may be disposed in the same manner as shown in FIG. 1, that is above the components 102.

Even in the absence of magnetic particles in the encapsulation material 112, an attack resulting in impairment or removal of the encapsulation material can change the value of the magnetic field exerted on the elements 118 due to the difference in magnetic susceptibility value between the encapsulation material 112 and air. In addition, if an attack on the device 100 results in a modification in the portion 126, for example if a wire diversion is made on the portion 126, then the magnetic field to which the elements 118 are subjected is modified, yielding a modification in the impedance of the elements 118. If an attack on the device 100 results in a modification in the elements 118, for example if a wire diversion is made on one of the elements 118, then the geometry of that element 118 is modified by that attack, which yields a modification in its impedance. If a wire diversion is performed on the element 118, this is detected either via the loss of the GMI effect when a non-magnetic material is used for this wire diversion, or via a modification in the magnetic anisotropy of the element 118 if a magnetic material is used for this wire diversion.

Any change to the protective element 114 (modification in the distance between the portion 126 and at least one of the elements 118, modification in the magnetic field applied to the elements 118, modification in the eddy currents generated, etc.) therefore yields a modification in the impedance of the elements 118 which results in a detection of the attack against the device 100.

In an alternative, it is possible that the protective element 114 comprises the portion 126 and a single element 118 disposed next to the portion 126.

According to another alternative, it is possible that the electrically conductive material of the portion 126 comprises a GMI-effect electrically conductive material like the element(s) 118 disposed next to the portion 126. In this case, the portion 126 forms, with respect to the element(s) 118, a magnetic field emitter to which the element(s) 118 is/are subjected, and the element(s) 118 form(s), with respect to the portion 126, a magnetic field emitter or magnetic field emitters to which the portion 126 is subjected. Thus, the values of the impedances of elements 118 and 126 are intrinsically linked to the magnetic fields they exert on each other. Any modification in one element will cause a modification in the impedance of the other element.

Figure 6:
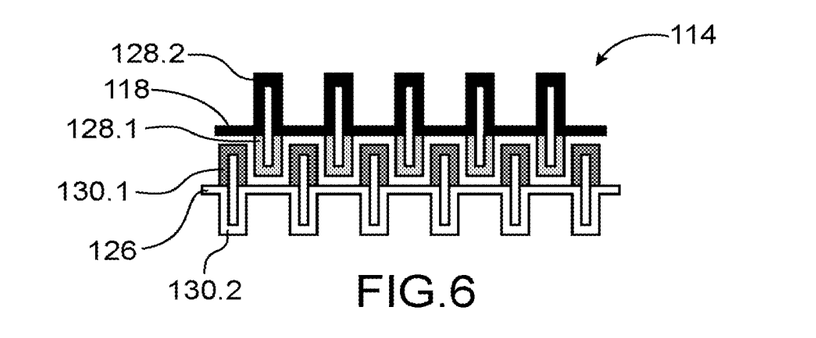

FIG. 6 shows another alternative embodiment of a protective element 114 of the device 100.

Here, the protective element 114 comprises an element 118 and a portion 126 both comprising a GMI-effect electrically conductive material. Thus, as in the alternative embodiment previously described, each of these elements 118, 126 forms, with respect to the other, a magnetic field emitter for obtaining a GMI effect in the other element.

The element 118 and the portion 126 extend in front of the face of the device 100 to be protected, for example in a pattern of coil(s) and/or spiral(s). When the protected face of the device 100 corresponds to the face 116, the elements 118 and the portion 126 may be disposed in the same manner as shown in FIG. 1, that is above the components 102.

In this alternative, several parts of the element 118 are each formed by two distinct portions, referenced 128.1 and 128.2, spaced apart from each other and each comprising two ends connected to both ends of the other portion. Similarly, several parts of the portion 126 are each formed by two distinct portions, referenced 130.1 and 130.2, spaced apart from each other and each comprising two ends connected to both ends of the other portion. Finally, the element 118 and the portion 126 are disposed next to each other such that the portions 128.1 of the parts of the element 118 being on the side of the portion 126 are disposed in an interlocking manner, or in the form of interdigitated combs, with the portions 130.1 of the parts of the portion 126 situated on the side of the element 118.

In this alternative, the division of the element 118 into two distinct portions 128.1, 128.2 forms a divider for the current flowing in the element 118. The same is true for portion 126. This configuration allows the interdigitated portions 128.1 and 130.1 to undergo a stronger magnetic field than the other non-interlocked portions 128.2 and 130.2. These portions 128.1 and 130.1 therefore have a different impedance (depending on the embodiment) than the portions 128.2 and 130.2, which means that the value of the current flowing through these portions 128.1 and 130.1 is different from that of the current flowing through the portions 128.2 and 130.2.

If an attack on the device 100 yields a modification in one of the interlocked portions 128.1 and 130.1, then the portions between which this damaged portion is located undergo a different magnetic field, and the current flowing in these portions changes. This modification in current yields emission of a different magnetic field, thereby modifying the value of the current flowing in the peripheral portions. Thus, the modifications in impedance of the portions 128.1 and 130.1 generated by this attack are propagated closely throughout the protective element 114, making such an attack easily detectable.

In the previously described alternatives, the portion 126 extends in front of the protected face of the device 100 in a pattern similar to that of the element(s) 118. Alternatively, it is possible that this pattern is different.

In all of the previously described alternatives, it is possible to measure the impedance of only some parts of the element(s) 118, which then form sensors lying in different regions of the face protected by the protective element 114.

According to an alternative embodiment, the element 118 and the portion 126 may be used as antennas. The electromagnetic wave emitted by one of these two antennas depends on the magnetic field exerted thereon, and the reception of this wave by the other antenna also depends on this magnetic field.

In this alternative embodiment, the portion 126 may or may not comprise a GMI-effect electrically conductive material.

Figure 7:
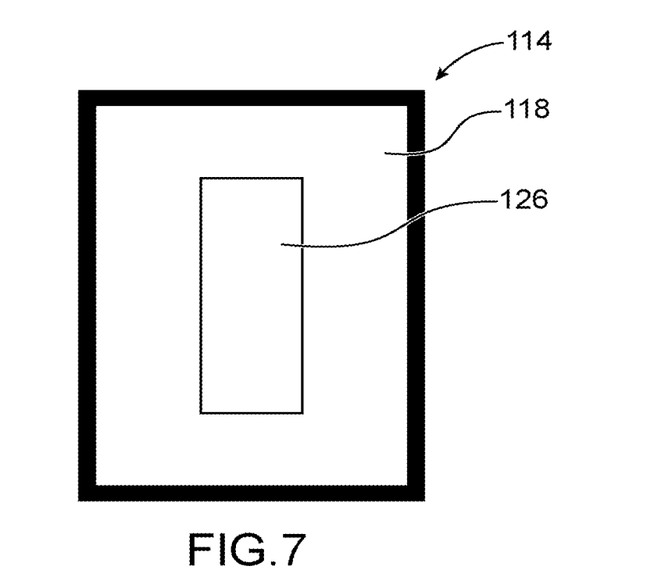
Figure 8:
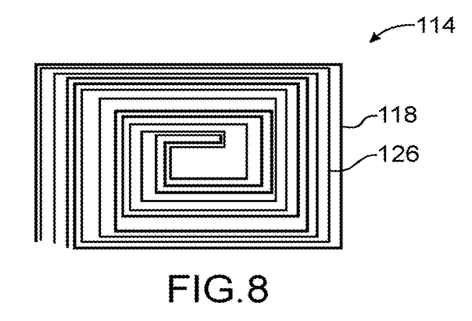
Figure 9:
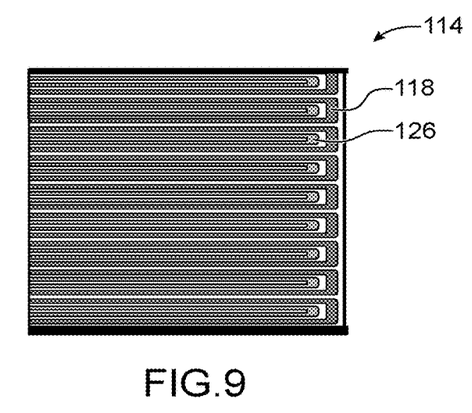

FIGS. 7, 8 and 9 show different possible configurations of the element 118 and the portion 126 forming two antennas coupled to each other such that the magnetic field emitted by one of these antennas acts on the other antenna.

As in the previous alternatives, the element 118 and the portion 126 extend in front of the face of the device 100 to be protected. When the protected face of the device 100 corresponds to the face 116, the elements 118 and the portion 126 may be disposed in the same manner as shown in FIG. 1, that is above the components 102.

In another alternative, the detection element 118 is connected as a resonant circuit, for example of the LC or RLC type. The resonance obtained, which corresponds to a configuration where the imaginary parts of the impedances or admittances cancel out in the resonant circuit at a given frequency, depends on the magnetic field exerted on the element 118 either by magnetic particles dispersed in the encapsulation material 112, or by at least one portion 126 of electrically conductive material through which a direct electric current flows. A modification in the magnetic field exerted on the element 118 results in a modification in the resonant frequency. This change in frequency may be detected to identify an attack on the device 100.

In another alternative, the element 118 includes one or more parts the dimensions of which are such that the electrical properties of said parts are degraded during an attack on the device 100. Thus, such part(s) the dimensions of which are reduced relative to the rest of the element 118 may perform a fuse function. Upon a modification in the magnetic field to which these parts are subjected, this modification yields an increase in the current flowing in these parts of the element 118. This increase in current heats up the element 118, which may cause the material of the part or parts of the element 118 to melt.

In another alternative, the element 118 and the portion 126 extend in front of the protected face of the device 100 and are disposed on different planes such that the distance between them is not constant.

Figure 10:
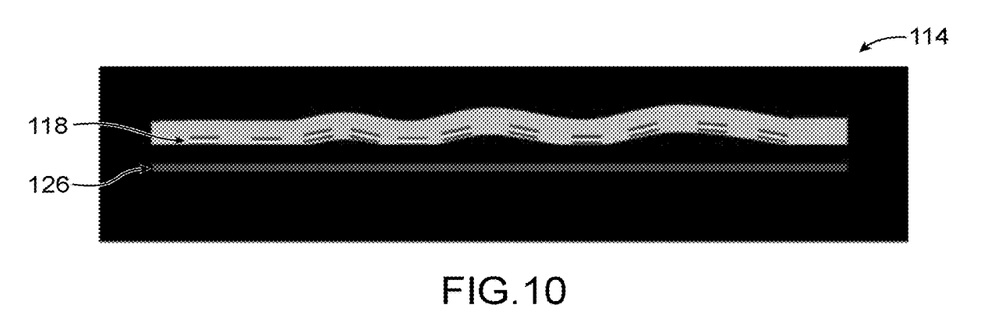

FIG. 10 schematically shows one exemplary embodiment of a protective element 114 according to this alternative embodiment. In this figure, the element 118 is positioned above the portion 126 which generates the magnetic field used to generate the GMI effect in the element 118. Such a configuration is, for example, obtained by first forming the portion 126 into the desired pattern and then covering it with a layer of material for forming part of the encapsulation material 112. This layer of material is then textured to form a relief onto which the element 118 is then deposited. The element 118 is then covered with another layer of material to complete the encapsulation material 112.

Variations in the distance between the element 118 and the portion 126 thus modify the magnetic field perceived by different regions of the element 118.

According to another alternative embodiment, the encapsulation material 112 may be stressed. This stressed encapsulation material 112 may correspond to an epoxy resin, for example. In this case, mechanical forces are exerted on the element 118 and influence its properties, especially the GMI effect produced. If the encapsulation material 112 is at least party removed locally during an attack on the device 100, these forces decrease, which locally modifies the response of the element 118 based on the GMI effect, especially its impedance. This modification can be detected, thereby detecting an attack on the device 100.

In all of the alternative embodiments previously described, the device 100 may comprise a device for reading the impedance of the element 118 and a memory in which at least one reference value of the impedance of the element 118 is stored. An alternating current source external to the device 100 is electrically coupled to the detection element 118 such that this current flows through the element 118. Thus, during operation of the device 100, the value of the impedance of the element 118 is measured and compared in order to verify whether the device 100 has been attacked or is being attacked.

It should be noted that other types of elements forming the magnetic field emitter of the protective element 114 may be contemplated.

The invention claimed is:

1. A chip or SiP type device, comprising:
    an electronic component;
    at least one protective element for protecting at least a portion of at least one face of the device so as protect the electronic component from an attack by electromagnetic radiation, said at least one protective element being disposed in the device between the at least one face and the electronic component and comprising:
        an attack detection element of the device comprising at least one electrically conductive material with a giant magneto-impedance, GMI, effect, and
        a magnetic field emitter to which said at least one GMI-effect electrically conductive material is to be subjected;
    an impedance measuring device which measures an impedance of the attack detection element of the device;
    a memory in which at least one reference value of the impedance of the attack detection element of the device is to be stored; and
    circuitry configured to
        measure the impedance of the attack detection element of the device using the impedance measuring device,
        compare the measured impedance with the at least one reference value of the impedance of the attack detection element of the device stored in the memory, and
        when the measured impedance is different from the at least one reference value, take protective measures,
    wherein the GMI effect is to be achieved in said at least one GMI-effect electrically conductive material when an exciting alternating electric current flows therethrough and when subjected to the magnetic field of the magnetic field emitter,
    wherein said at least one GMI-effect electrically conductive material exhibits at least one magnetic anisotropy, and
    wherein the protective measures include deleting data stored on the device or turning the device off.

2. The device according to claim 1, wherein said at least one GMI-effect electrically conductive material is a soft ferromagnetic material.

3. The device according to claim 1, wherein the attack detection element of the device comprises at least:
    a portion of said at least one GMI-effect electrically conductive material, or
    a portion of non-magnetic and electrically conductive material disposed between at least two portions of said at least one GMI-effect electrically conductive material, or
    a portion of non-magnetic and electrically conductive material surrounded by said at least one GMI-effect electrically conductive material which forms a sheath around the portion of non-magnetic and electrically conductive material, or
    an alternating stack of portions of non-magnetic electrically conductive material and portions of said at least one GMI-effect electrically conductive material.

4. The device according to claim 1, wherein the at least one magnetic anisotropy of the at least one GMI-effect electrically conductive material has randomly generated variability.

5. The device according to claim 1, wherein said at least one protective element forms a sensor situated in front of said at least part of said at least one face of the device protected by said at least one protective element, or wherein said at least one protective element forms a protective layer disposed in front of the entire surface of said at least one face of the device protected by said at least one protective element.

6. The device according to claim 1, wherein the attack detection element of the device extends, in a plane parallel to said at least one face of the device protected by said at least one protective element, in at least one of a coil pattern or a spiral pattern.

7. The device according to claim 1, wherein the magnetic field emitter comprises at least one of particles of magnetic material dispersed in a material at least partially surrounding the attack detection element of the device, or at least one portion of electrically conductive material through which a direct or alternating electric current is to flow.

8. The device according to claim 7, wherein the electrically conductive material of the at least one portion of electrically conductive material of the magnetic field emitter is a GMI-effect electrically conductive material.

9. The device according to claim 8, wherein:
    several parts of the attack detection element of the device are each formed by at least two distinct portions, spaced apart from each other and each comprising two ends connected to both ends of the other portion, and
    several parts of the at least one portion of electrically conductive material of the magnetic field emitter are each formed by at least two distinct portions, spaced apart from each other and each comprising two ends connected to both ends of the other portion, and
    the attack detection element of the device and the at least one portion of electrically conductive material of the magnetic field emitter are disposed next to each other and such that the portions of the parts of the attack detection element of the device being on the side of the at least one portion of electrically conductive material of the magnetic field emitter are disposed in an interlocking manner with the portions of the parts of said at least one portion of electrically conductive material of the magnetic field emitter being on the side of the attack detection element of the device.

10. The device according to claim 7, wherein said at least one protective element comprises at least two distinct attack detection elements of the device extending next to each other and next to which said at least one portion of electrically conductive material of the magnetic field emitter is disposed.

11. The device according to claim 7, wherein the attack detection element of the device and said at least one portion of electrically conductive material of the magnetic field emitter are disposed in two different planes and such that a distance therebetween, along a direction perpendicular to said at least one face of the device protected by said at least one protective element, is not constant.

12. The device according to claim 1, wherein the attack detection element of the device comprises one or more parts presenting dimensions such that said parts are degraded during an attack of the device.

13. The device according to claim 1, wherein the memory stores a plurality of binary values, each of said binary values being representative of a comparison between a reference value and an impedance value of the attack detection element of the device for a given value of the magnetic field emitted by the magnetic field emitter.

14. The device according to claim 1, wherein the circuitry is configured to measure the impedance of the attack detection element of the device when an exciting alternating electric current flows through the at least one GMI-effect electrically conductive material thereby being subjected to the magnetic field of the magnetic field emitter and achieving the GMT effect, a frequency of the exciting alternating electric current being between 1 kHz and 10 GHz, and an amplitude of the exciting alternating electric current being between 5 mA and 300 mA.

* * * * *